US005672869A

United States Patent [19]
Windig et al.

[11] Patent Number: 5,672,869
[45] Date of Patent: Sep. 30, 1997

[54] NOISE AND BACKGROUND REDUCTION METHOD FOR COMPONENT DETECTION IN CHROMATOGRAPHY/SPECTROMETRY

[75] Inventors: Willem Windig, Rochester; Alan W. Payne, Fairport, both of N.Y.

[73] Assignee: Eastman Kodak Company, Rochester, N.Y.

[21] Appl. No.: 627,852

[22] Filed: Apr. 3, 1996

[51] Int. Cl.[6] .............................. B01D 59/94; H01J 49/00
[52] U.S. Cl. .............................. 250/282; 250/288 A
[58] Field of Search .............................. 250/282, 288, 250/288 A; 73/23.2

[56] References Cited

U.S. PATENT DOCUMENTS

| | | | |
|---|---|---|---|
| 4,837,726 | 6/1989 | Hunkapillar | 73/23.23 |
| 5,291,426 | 3/1994 | Collins et al. | 364/574 |
| 5,352,891 | 10/1994 | Monnig et al. | 250/282 |
| 5,481,476 | 1/1996 | Windig | 73/23.2 |
| 5,545,895 | 8/1996 | Wright et al. | 250/282 |

*Primary Examiner*—Bruce Anderson
*Attorney, Agent, or Firm*—Arthur H. Rosenstein

[57] ABSTRACT

A method of identifying and quantifying the chemical components of a mixture of organic material comprises subjecting the organic material to chromatography to separate the components of the mixture and subjecting the separated materials to spectrometry to detect and identify the components. A variable selection procedure is described that results in well resolved chromatography which facilitates the proper interpretation.

7 Claims, 7 Drawing Sheets

NOISE AND BACKGROUND REDUCTION METHOD FOR COMPONENT DETECTION IN CHROMATOGRAPHY/SPECTROMETRY

FIELD OF THE INVENTION

This invention relates to a method to reduce the noise and the background of total ion chromatograms obtained from the combined technique of chromatography and spectrometry, which is a technique used to analyze the composition of materials. The method greatly improves the efficiency of the detection of components in a material.

BACKGROUND OF THE INVENTION

In the detection and identification of components in a material, the combination of chromatography such as liquid chromatography (LC) with spectrometry such as mass spectrometry (MS) frequently results in chromatograms with a high level of background and noise. The use of background subtraction techniques of the prior art such as the Bitter Biemann algorithm described in J. E. Biller, K. Biemann, *Anal. Letters,* 1974, 7, 515–528; and R. G. Dromery, J. J. Stefik, T. C. Reindfleisch, A. M. Duffield, *Anal. Chem.,* 1976, 48, 1368–1375 are of limited success in obtaining low noise and low background.

The problem most often confronted is with the combined technique of liquid chromatography/mass spectrometry (see for example: Arpino, P. (1992), *Mass Spectrum. Rev.,* 11,3; Bladey, C. R., and Vestal, M. L. (1983), *Anal. Chem.,*55, 750; J. B. Fenn,. M Mann,. C. K. Meng, S. F. Wong, C. M. Whitehouse (1990), Mass Spectrom Rev., 9, 37) but is also suited for other hyphenated techniques. The LC is used to separate mixtures into individual components which in turn are passed through to the MS where mass spectral information is obtained on each component. The mass spectral information is used as a component detection system, and may also be used to characterize the molecular structure of the components.

Liquid chromatography itself, is one type of chromatography technique. Chromatography is a method for separating mixtures. In the simplest application of a chromatographic process, a vertical tube is filled with a finely divided solid known as the stationary phase. The mixture of materials to be separated is placed at the top of the tube and is slowly washed down with a suitable liquid, or fluent, known as the mobile phase.

The mixture first dissolves, each molecule is transported in the flowing liquid, and then becomes attached, or adsorbed, to the stationary solid. Each type of molecule will spend a different amount of time in the liquid phase, depending on its tendency to be adsorbed, so each compound will descend through the tube at a different rate, thus separating from every other compound.

The molecules of the mixture to be separated pass many times between the mobile and stationary phases. The rate at which they do so depends on the mobility of the molecules, the temperature, and the binding forces involved. It is the difference in the time that each type of molecule spends in the mobile phase that leads to a difference in the transport velocity and to the separation of substances. (See FIG. 1*a*.)

Liquid chromatography (LC), is a refinement of standard column chromatography. Here, the particles that carry the stationary liquid phase are very small (0.01 mm/0.0004 in) and very uniform in size. For these reasons, the stationary phase offers a large surface area to the sample molecules in the mobile liquid phase. The large pressure drop created in the column filled with such small particles is overcome by using a high-pressure pump to drive the mobile liquid phase through the column in a reasonable time.

Chromatography is used primarily as a separation technique. Despite the differences in the analysis times for different species noted above, there is generally insufficient specificity to allow identification of the components. For this reason, it is common for chromatographic techniques to be used in series with an identification technique, the technique most suitable and most often used being mass spectrometry.

The mass spectrum of a component generally provides a measure of the molecular weight of the component and also provides a characteristic "fingerprint" fragmentation pattern. In a mass spectrometer, the component molecules become ionized and will be excited with a range of energies. Those molecules with least energy generally remain intact and when detected provide a measure of the component's molecular weight. Those molecules ionized with higher amounts of energy will fragment to form smaller product ions characteristic of the molecular structure. To obtain the molecular structure, the fragment ions produced can be pieced together to provide the initial molecular structure. An alternative method for obtaining the molecular structure from the mass spectrum is to compare the spectrum of the component with a large library of reference mass spectra. The unique nature of a component's mass spectrum generally allows ready and unequivocal identification if there is an example of the mass spectrum of that component in the reference library.

For LCMS, the chromatographic device is interfaced directly to a mass spectrometer which is scanned repetitively (e.g. every 1–5 sec.) as the separated components elute from the chromatograph. In this way a large number of mass spectra are recorded for each analysis. Many of the spectra will record only "background", i.e. when no components are eluting from the chromatograph. As each component elutes from the chromatograph, the mass spectra will change depending on the nature of the component entering the mass spectrometer. Each mass spectrum produced will contain a certain number of ions, which in turn give rise to an ion current which is plotted against time to produce a total ion chromatogram (TIC). This is generally the initial output of the LCMS technique and forms the basis of the component detection device. An alternative plot is that of an individual mass against time to produce a mass chromatogram which will show just where that particular mass is detected during the analysis.

For samples with UV chromophores, an in-line UV detector can be used to detect peaks. Knowing the peak retention times, the corresponding mass spectra can then be obtained. This indirect peak detection method is clearly limited to components with chromophores, which is a serious limitation.

In liquid chromatography/mass spectrometry (LCMS), most of the liquid mobile phase must be removed in the interface region prior to entering the mass spectrometer as mass spectrometers need to operate under high vacuum. (See FIG. 1*b*). However, the liquid mobile phase is present in such excess that the mobile phase is still present in excess to analyte species even after passage through the interface. To obtain good component separations and clean passage of components through an LC column, it is also generally necessary to add buffers to the mobile phase. Hence, mobile phase with associated buffer pass continually through to the mass spectrometer, become ionized and are the major species responsible for the "background" spectra referred to above. Unfortunately, particularly for the popular "spray" LCMS interfacing and ionizing techniques (e.g. electrospray, thermospray), this background varies considerably with time and cannot just be subtracted from analyte spectra.

A flow diagram of a LC-MS experiment is presented (FIG. 2).

There are several features of LC-MS data which make visual analysis difficult with respect to the identification of the components present. These features are illustrated in FIG. 3*a*, for an electrospray LCMS experiment. The TIC shown in FIG. 3*a* has high background and noise levels, consequently few, if any, distinct peaks can be observed. Despite the noisy appearance of the total ion current trace (TIC) (see FIG. 3*a*), individual mass spectra obtained when components elute from the column and pass through to the electrospray ion source are generally of high quality. The problem is that the level of ion current frequently remains approximately constant as components elute from the column. For many analyses, it has been found necessary to manually examine all of the mass spectra from the LC-MS run, extract a list of masses of components that appear to be "real" and produce a combined plot of the mass chromatograms of these extracted masses. In this way a high quality (i.e. low noise and background) reduced total ion chromatogram can be produced, see FIG. 3*b*, but this process is time-consuming (up to a day or more) and tedious. Furthermore, it has been shown that the operator may miss highly overlapping and minor components There are several prior art methods that deal with part of the problems of this so-called chemical noise, but are not suited for the analysis of the complex chromatographic data described above.

The Biller Biemann algorithm (J. E. Biller, K. Biemann, *Anal. Letters*, 1974, 7, 515–528; and R. G. Dromery, M. J. Stefik, T. C. Reindfleisch, A. M. Duffield, *Anal. Chem.*, 1976, 48, 1368–1375) is primarily a method for resolution enhancement: overlapping peaks can be separated. It works well for high quality data, i.e. where the peaks can clearly be discriminated from the background signal. The Biller Biemann Algorithm does not perform well for data with a high amount of chemical noise, such as LCMS data.

Background subtraction can be performed (Goodley, P., Imitani, K., *Am. Lab*, 1993, 25, 36B–36D), but for complex data it is of limited use, due to the fact that the background is not constant, quantitatively or qualitatively over the duration of the chromatographic analysis.

The majority of recent work in the field of improving the results of hyphenated data is in the field of curve resolution (such as in J. C. Hamilton, P. J. Gemperline, *J. Chemometrics*, 1990, 4, 1–13.). Curve resolution techniques are able to resolve overlapping peaks of hyphenated techniques such as GC-MS (Gas Chromatography-Mass Spectrometry) and LC-UV (Liquid chromatography, ultraviolet spectroscopy). Although these techniques are successful, they are not suited to deal with whole chromatograms with high background and noise levels. Furthermore, these techniques generally assume one peak in a chromatogram of a single variable (e.g., a mass). Due to the presence of isomers and components with common fragments, mass chromatograms with more than one peak are common.

Recently an automated approach was described to extract the relevant peaks from GC-MS data with high noise and high background (B. E. Abbassi, H. Mestdagh, C. Rolando, *Int. J. Mass Spectrum. Ion Proc.*, 1995, 141, 171–186). This technique assumes that peaks can be one or two scans wide. Therefore, actual peaks cannot be separated from noise peaks by simple means. In order to deal with this problem, an elaborate, time consuming technique was developed that was demonstrated to work well. The disadvantages of this technique are that it is very time consuming (up to 10 minutes), and that it transforms the original data in order to enhance the quality of the signal.

In LC-MS data, high quality mass chromatograms are present, and a selection of these high quality chromatograms is preferable to a transformation of noisy signals.

SUMMARY OF THE INVENTION

The principle object of the invention is to provide an improved method of qualitative and quantitative analysis for identifying and qnantifying the chemical components of a complex mixture.

Another object of the present invention is to provide such a method that is especially suited for methods that result in data with a high background and noise level.

Another object of the invention is to provide an analysis of a data set resulting from a chromatographic method with spectrometric detection so that all components that give rise to detectable spectra, will be detected.

Another object of the invention is to provide a highly efficient smoothing operation.

Another object of the invention is to provide such a method that does not transform the original chromatographic data, but to provide a selection of high quality chromatographic data.

Another object of the invention is to reduce the number of selected chromatograms to a minimum, while preserving information about all the components in the mixture.

Another object for the invention is to make it possible to select mass chromatograms with more than one peak to accommodate isomers and components with common fragments.

Another object of the invention is to provide such a method that is fast, i.e., less than five minutes.

The present invention is drawn to a method of identifying and quantifying the chemical components of a mixture of organic materials comprising;

a first step of subjecting said organic material to chromatography to separate components of said mixture and a second step of subjecting the separated materials to spectrometry to detect and identify said components, wherein said chromatography and spectrometry is performed by a) injecting a sample into a column;

b) separating components by partitioning at different rates in the column;

c) passing separated components into a spectrometer;

d) obtaining a series of spectra to detect all species present; and e) storing the spectra in a computer file; the improvement comprising enhancing the spectral data by a variable selection using the following steps:

i) smooth the spectroscopic variables;

ii) obtain the mean value of the intensity of the spectroscopic variables;

iii) subtract the mean value obtained in step ii from the smooth variables obtained in step i;

iv) normalize the output of step iii and the original spectroscopic variables;

v) compare the values of step iv to obtain a measure of similarity for each spectroscopic variable;

vi) determine a threshold value of similarity measurement so as to reject unwanted signals;

vii) select only those spectroscopic variables whose similarity measurement is over the threshold value; and viii) plot the sum of the selected variables versus time to obtain the enhanced chromatogram.

Figure 1A:
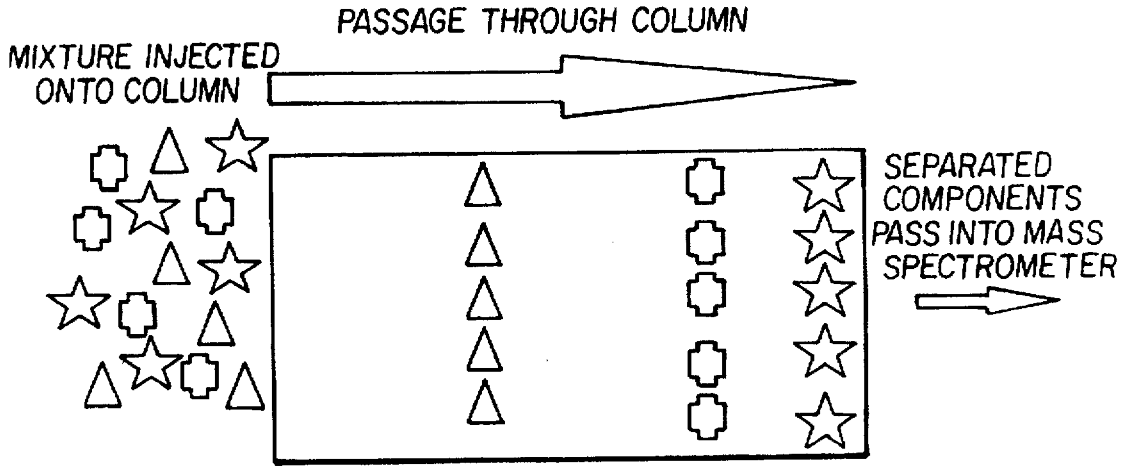
FIG. 1*a* is a schematic of a chromatographic separation of a three component mixture.

For a better understanding of the present invention, together with other and further objects, advantages and capabilities thereof, reference is made to the following detailed description and appended claims in connection with the preceding drawings and description of some aspects of the invention.

DETAILED DESCRIPTION OF THE PREFERRED EMBODIMENTS

A method is provided for improving the qualitative and quantitative analysis for identifying and quantifying the chemical components of a complex mixture.

The method comprises identifying and quantifying the chemical components of a mixture of organic materials comprising;

a first step of subjecting said organic material to chromatography to separate components of said mixture and a second step of subjecting the separated materials to spectrometry to detect and identify said components, wherein said chromatography and spectrometry is performed by a) injecting a sample into a column;

b) separating components by partitioning at different rates in the column;

c) passing separated components into a spectrometer;

d) obtaining a series of spectra to detect all species present; and e) storing the spectra in a computer file; the improvement comprising enhancing the spectral data by a variable selection using the following steps:

i) smooth the spectroscopic variables;

ii) obtain the mean value of the intensity of the spectroscopic variables;

iii) subtract the mean value obtained in step ii from the smoothed variables obtained in step i;

iv) normalize the output of step iii and the original spectroscopic variables;

v) compare the values of step iv to obtain a measure of similarity for each spectroscopic variable;

vi) determining a threshold value of similarity measurement so as to reject unwanted signals;

vii) select only those spectroscopic variables whose similarity measurement is over the threshold value; and viii) plot the sum of the selected variables versus time to obtain the enhanced chromatogram.

From the measured data, a quality index is calculated, which is inversely related to the amount of noise in the data and the intensity of the background. Variables (mass chromatograms) are selected which have a quality index above an operator defined level. The selected variables form a new data set of chromatographic data with a much higher quality, as expressed by a low noise level and a low background. This greatly facilitates the chemical interpretation, since the number of variables is reduced by more than an order of magnitude. The result is a faster and higher quality analysis. The selected variables can be reduced further by selecting the most intense variable for each component. This reduced selection again improves the quality of the data.

Although the example presented herein is of a liquid chromatography other chromatographies such as gas chromatography, and time-resolved direct analysis methods such as direct probe, laser analysis and fast atom bombardment and semi-separation methods such as direct probe, laser analysis and fast atom bombardment and the like may be used herein. Additionally, various spectrometry methods include mass spectrometry, UV spectrometry, NMR spectrometry, Raman, Infrared and the like which may be used in the present method.

Figure 3A:
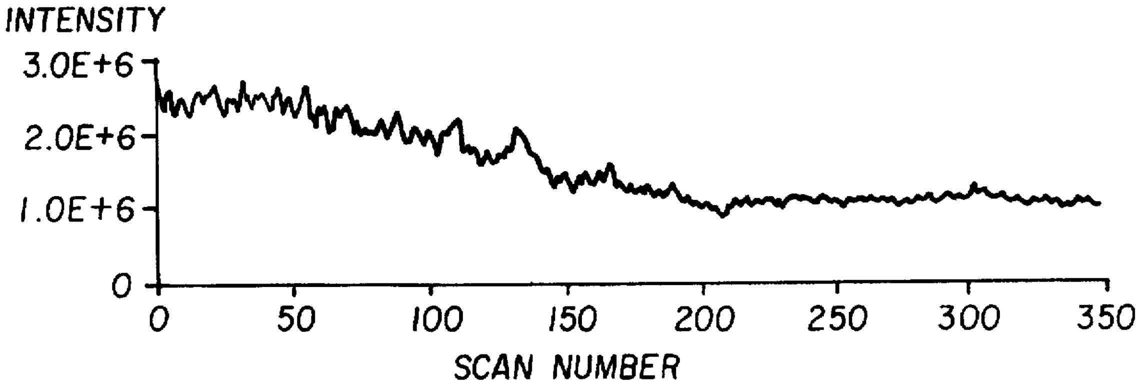
FIG. 3 is (a) The Total Ion Chromatogram (TIC), (b) The Total Extracted Ion Chromatogram (TEIC) of an experienced operator, (c) the TEIC of CODA and (d) the TEIC of the reduced CODA selection.
Figure 4A:
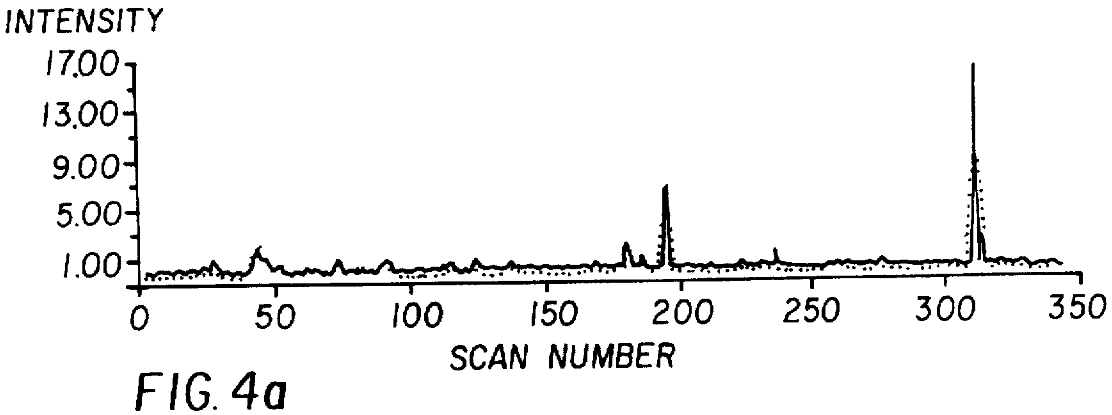
FIG. 4 is an example of mass chromatograms and their smoothed and standardized versions.
Figure 4B:
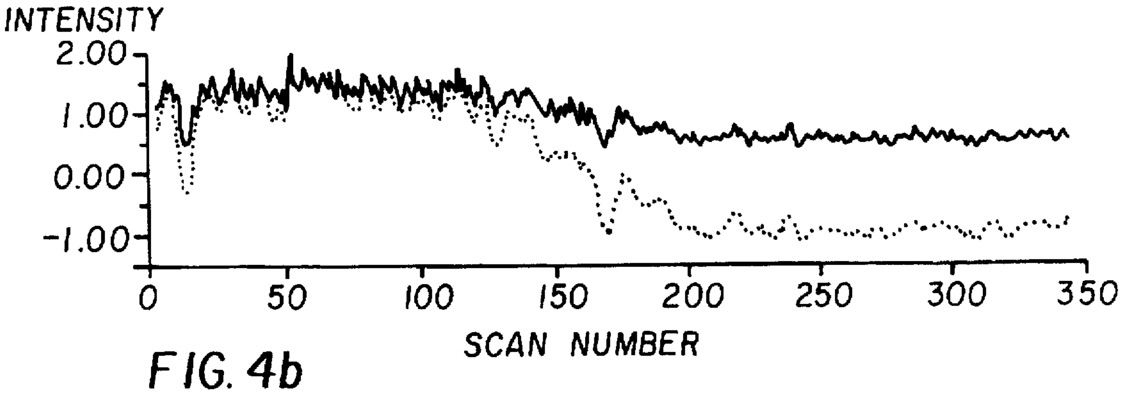
Figure 4C:
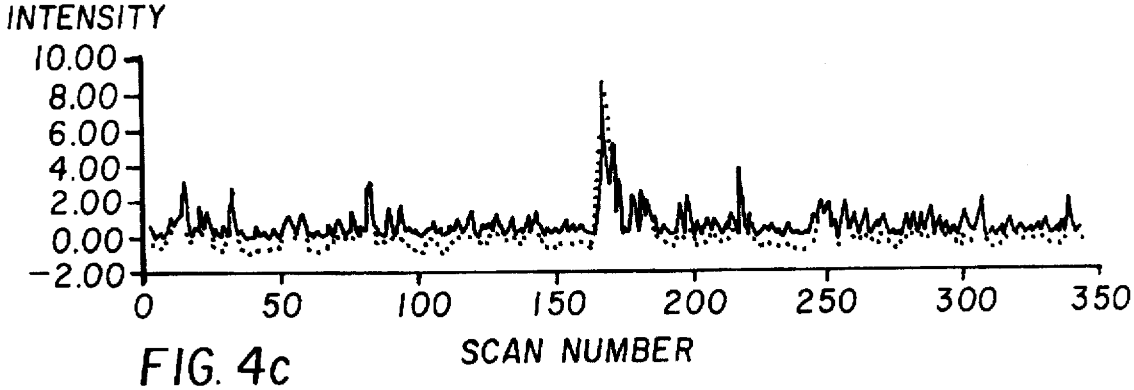
Figure 4D:
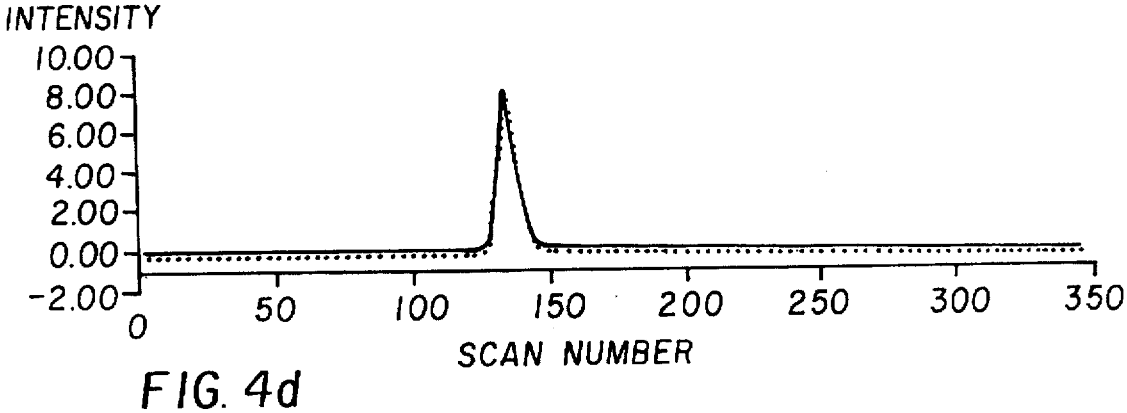
Figure 5:
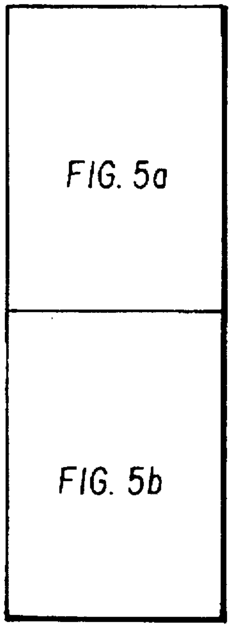
FIG. 5 is a flow diagram of CODA.
Figure 5A:
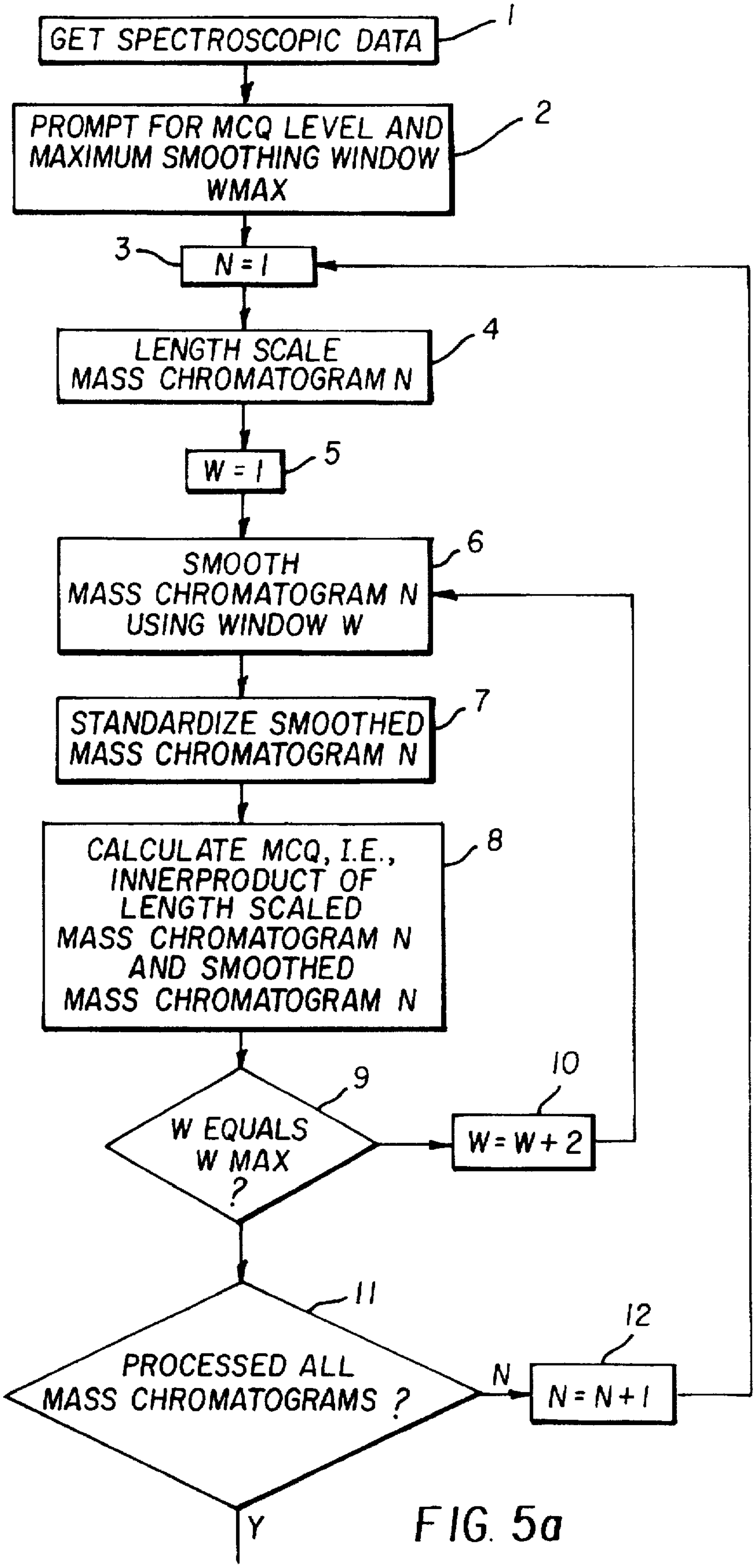
Figure 5B:
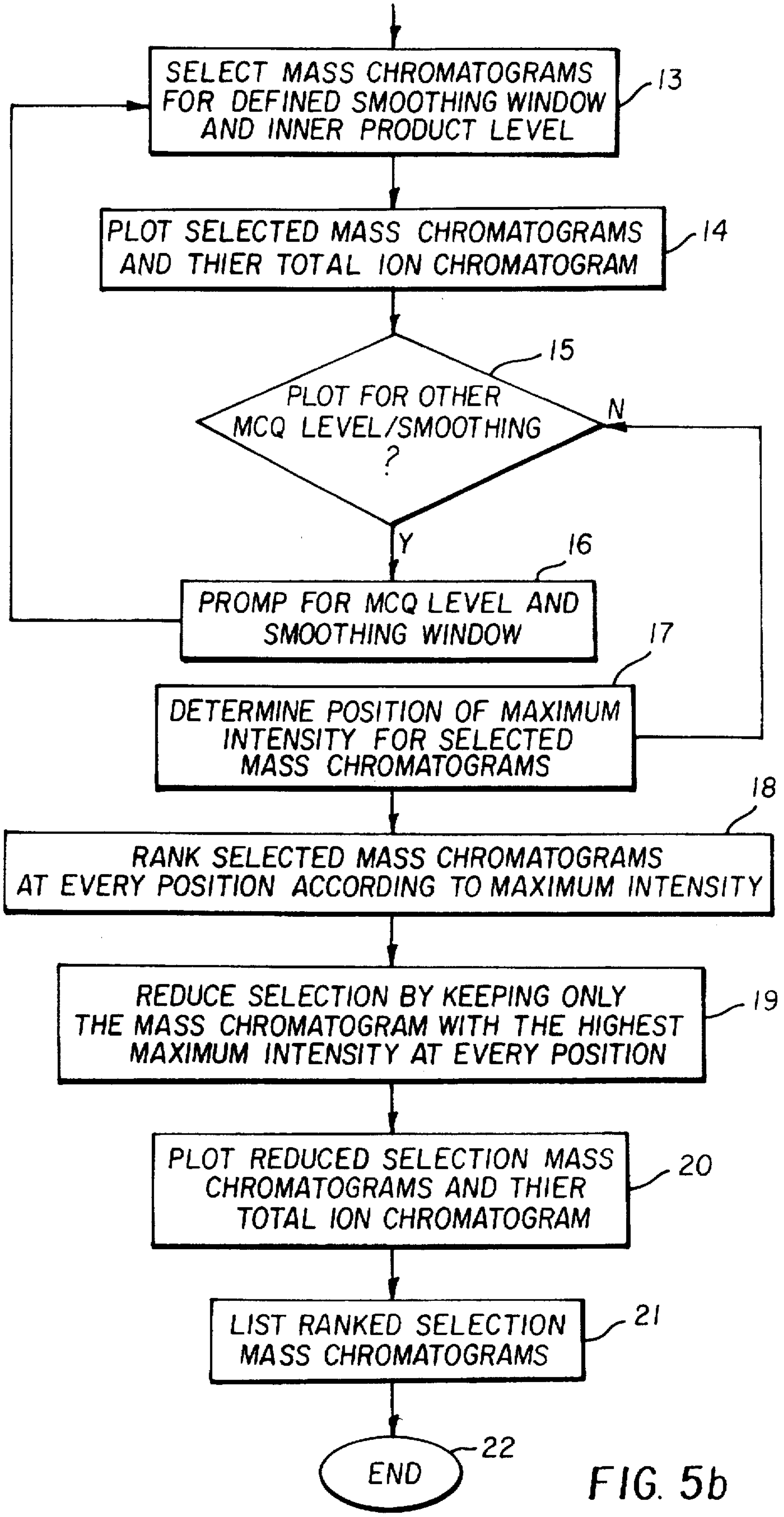

In order to illustrate the problems with LC-MS, the Total Ion Chromatogram (TIC) of an example discussed hereafter is shown in FIG. 3*a*. The TIC shown in FIG. 3*a* his high background and noise levels. Consequently few, if any, distinct peaks can be observed. FIG. 4 shows some typical mass chromatograms, which illustrate the causes of the peak detection problems. The mass chromatogram in FIG. 4*a* shows spikes (1 scan wide peaks) as the main feature, this is an example of noise. FIG. 4*b* shows a mass chromatogram heavily dominated by the mobile phase, such chromatograms are the source of a high background signal in the TIC. The mass chromatogram in FIG. 4*c* shows a peak broader than a single scan, but it also contains a significant amount of noise. FIG. 4*d* shows a good quality mass chromatogram; it has a low background and is virtually noise free. The purpose of the algorithm is to select mass chromatograms such as that shown in FIG. 4*d*. This is done by calculating a similarity index between each mass chromatogram and the corresponding smoothed mass chromatogram. The process by which this is achieved is described below, and is illustrated in a flowdiagram in FIG. 5.

The chromatographic data is available as a file in the computer on which the CODA program is run. CODA means Component Detection Algorithm. Getting the data from the instrument computer is done by well established methods and commercially available software.

The data is represented by matrix A and comprises r rows and c columns, in which r represents the number of spectra and c the number of variables (masses).

Later a so-called Mass Chromatogram Quality (MCQ) index is calculated, in which smoothing is part of the procedure. Values used for the calculations will be given here. The MCQ index will be calculated for several degrees of smoothing, as defined by a smoothing window. The maximum smoothing window WMAX is defined as the upper limit of rectangular smoothing windows used in the procedure. WMAX is an odd number, and the smoothing procedure is applied for the following windows: 1,3,5, . . . WMAX.

N is a counter for the mass chromatograms. N starts at the lowest mass of the scan range for the experiment.

The mass chromatogram is scaled to equal length according to the following procedure:

$$\lambda_j=\sqrt{\sum_{i=1}^{r} a_{ij}^2} \qquad \text{eq. 1}$$

wherein $\lambda_j$ is the length of variable j, $a_{ij}$ is an element of the original data matrix A, where i represents the spectrum index and where j represents the variable index.

Next, the length-scaled matrix A(λ) is obtained by dividing all the variables by their length $$\alpha(\lambda)_{ij}=\alpha_{ij}/\lambda_j \qquad \text{eq. 2}$$

For the smoothing, a simple rectangular window is chosen. This greatly simplifies the calculations, which is important for large data matrices (the data set used can have 300 spectra, each with 1345 mass units). The data are smoothed for window sizes W from 1 to WMAX. (Window 1 amounts to no smoothing). As an example, the smoothing for a window size of 5 will be given. For smoothing with a rectangular window of width w, the matrix $W_5$ is as follows.

$$W_5=\begin{pmatrix} 1 & 1 & 1 & 1 & 1 & 0 & \dots & \dots & \dots & \dots & \dots & \dots & \dots & 0 \\ 0 & 1 & 1 & 1 & 1 & 1 & 0 & \dots & \dots & \dots & \dots & \dots & \dots & 0 \\ 0 & \dots & \dots & \dots & \dots & \dots & \dots & \dots & \dots & \dots & \dots & \dots & \dots & 0 \\ 0 & \dots & \dots & \dots & \dots & \dots & \dots & 0 & 1 & 1 & 1 & 1 & 1 & 0 \\ 0 & \dots & \dots & \dots & \dots & \dots & \dots & \dots & 0 & 1 & 1 & 1 & 1 & 1 \end{pmatrix} \qquad \text{eq. 3}$$

It should be noted that the size of $W_w$ is (r−w+1)*r, the subscript w having the units scans represents the width of the window, which is 5 in the example given. Only odd values for the width of the rectangular peak are used, in order to have symmetrical peaks. The matrix has a diagonal band of width w with ones, the other elements are 0. The equation to calculate the smoothed mass chromatograms is as follows:

$$A(w)^R=\frac{1}{w}W_wA \qquad \text{eq. 4}$$

The smoothing procedure limits the size of the resulting matrix (A(w)R/ij) from r*c to (r−w+1)*c, therefore the superscript R is used to denote this data reduction. This is basically the convolution of the mass chromatograms with a rectangular window. Normally, a fast Fourier transform is used for this. Due to the simple character of the matrix $W_w$, it is more efficient to calculate A(w)R/ij as follows:

$$a(w)_{ij}^R=\frac{1}{w}\sum_{k=i}^{i+w-1} a_{kj} \qquad \text{eq. 5}$$

An additional advantage of this calculation is that the results for a window width of 3 can be used for the calculations for a window width of 5, etc.

The standardization of the smoothed mass chromatogram is described by the following equations:

$$a(w,s)_{ij}^R=\frac{a(w)_{ij}^R-\mu(w)_j^R}{\sigma(w)_j^R} \qquad \text{eq. 6}$$

where α(w,s)R/ij stands for an element of the matrix A, which was first smoothed and then standardized.

where the mean $\mu(w)_j$ is defined as $$\mu(w)_j^R=\sum_{i=1}^{r-w+1}\frac{a(w)_{ij}^R}{r-w+1} \qquad \text{eq. 7}$$

and the standard deviation $\sigma(w)_j$ as $$\sigma(w)_j^R=\sqrt{\frac{1}{r-w+1}\sum_{i=1}^{r-w+1}(a(w)_{ij}^R-\mu(w)_j^R)^2} \qquad \text{eq. 8}$$

The MCQ (Mass Chromatogram Quality Index) is essentially the calculation of the similarity index $c_j$ between the length-scaled mass chromatogram and the smoothed standardized mass chromatogram, for which the following innerproduct is used:

$$c_j=\frac{1}{\sqrt{r-w+1}}\sum_{i=1}^{r-w+1} a(\lambda)_{ij}^R a(w,s)_{ij}^R \qquad \text{eq. 9}$$

α(w,s)R/ij is of reduced size. Therefore, the length scaled matrix A(λ) has can be reduced in size (by deleting the first (w−1)/2 spectra and the last (w−1)/2 spectra from the original matrix A, where w is the window size). The maximum value for the innerproducts calculated in this way is one.

The innerproduct of length-scaled and standardized data is not common. In order to demonstrate the effect of this similarity index, two aspects are considered (the innerproduct of a length-scaled mass chromatogram and the smoothed length-scaled mass chromatogram).

When a mass chromatogram has spikes (noise), the smoothed chromatogram will be different from the original chromatogram, which results in a low innerproduct. Alternatively, a noiseless (smooth) mass chromatogram will result in a high value for the innerproduct. As a consequence, the innerproduct between the length-scaled mass chromatogram and its smoothed length-scaled version is a spike detection tool; a low innerproduct will indicate the presence of spikes.

A mass chromatogram that has a high background, will have a relatively high mean value. As a consequence, there will be a significant difference between the length-scaled mass chromatogram and the standardized mass chromatogram, as expressed by their innerproduct. A good chromatogram will have low intensity baseline and a signal in a relatively small area. This results in a relatively low mean intensity value and hence there will be little difference between the length-scaled mass chromatogram and the standardized mass chromatogram. As a consequence, the innerproduct of the original length-scaled mass chromatogram and the standardized mass chromatogram (i.e., mean-substracted and normalized) is a tool to detect signals that contribute to the background in the TIC; a low innerproduct will indicate a signal that does contribute to the background.

The innerproduct of the original mass chromatogram and the standardized smoothed mass chromatogram, as given in eq. 9, combines both the spike and background sensitivity. In FIG. 4, a plot is given of original length scaled mass chromatograms and smoothed and standardized signals. As can be seen, the smoothed and standardized signals clearly show differences, based on the amount of noise and background. Since this innerproduct reflects the quality of the mass chromatogram, it will be called the mass chromatogram quality (MCQ) index. The MCQ indices are calculated for several smoothing window sizes. The calculations are checked for all the defined window sizes. The smoothing window can be increased by a value of 2. The increment is 2 in order to obtain symmetrical smoothing windows. All the mass chromatograms are checked to see if they have been processed. The counter of the mass chromatograms can then be increased by 1. At this point, the calculations are completed: The MCQ levels for the smoothing windows W from 1 to WMAX are available. The mass chromatograms above a defined MCQ level and smoothing window are calculated. The first time the program reaches this box, the MCQ level is as defined) and the smoothing window is the maximum smoothing window). The selected mass chromatograms and their total ion chromatograms are displayed as in FIG. 4. At this point, the operator has the choice to display the data for another MCQ level and Smoothing Window. (The smoothing Window has a minimum of 1, and a maximum of WMAX). If another display is required, the MCQ level and the Smoothing Window can be redefined, after which the programs display the results. Several mass chromatograms are often selected for the same component. These mass chromatograms will have a maximum value at the same scan position. Therefore, the scan positions for the selected mass chromatograms are determined. For every component, as defined by a scan position, the mass chromatograms are ranked according to maximum intensity. By selecting only the mass chromatograms for every component with the highest maximum intensity, the number of selected mass chromatograms can be reduced. The reduced selection is then displayed. A list of all the selected mass chromatograms is given (Table 1).

TABLE 1

Showing mass values selected by the program. At each scan position, the mass values are ranked in ascending order of maximum intensity.

| scan position | masses selected | | | | | |
|---|---|---|---|---|---|---|
| 109 | 316 | 315 | 257 | | | |
| 132 | 399 | | | | | |
| 133 | 186 | | | | | |
| 155 | 1288 | 1287 | | | | |
| 156 | 1265 | 633 | | | | |
| 159 | 781 | 799 | 798 | | | |
| 165 | 706 | | | | | |
| 167 | 1272 | 391 | | | | |
| 168 | 1267 | 1266 | 634 | 1251 | 1250 | 1249 |
| 169 | 1268 | 636 | 1252 | 625 | | |
| 170 | 544 | 1271 | | | | |
| 171 | 1087 | | | | | |
| 172 | 1109 | 1088 | | | | |
| 175 | 951 | | | | | |
| 176 | 661 | | | | | |
| 177 | 936 | | | | | |
| 178 | 935 | | | | | |
| 181 | 1299 | 1278 | 1277 | | | |
| 183 | 509 | | | | | |
| 189 | 455 | | | | | |
| 204 | 1482 | 1461 | 1460 | | | |
| 206 | 1483 | 731 | 739 | | | |
| 210 | 1298 | | | | | |
| 225 | 1142 | | | | | |
| 226 | 1143 | 1120 | | | | |
| 227 | 1121 | | | | | |
| 302 | 1274 | | | | | |
| 305 | 609 | 630 | 667 | | | |
| 306 | 1217 | 608 | 666 | | | |
| 307 | 1216 | | | | | |

The following example illustrates the method of reducing the background and noise of an LC-MS chromatogram.

EXAMPLE 1

Mass Spectral Analysis

The LC-MS analysis was performed on a Fisons Instruments Quattro mass spectrometer coupled to a Hewlett Packard 1090 liquid chromatograph via a Fisons electrospray interface. The LC-MS chromatograms shown are of a surfactant mixture separated on a Hewlett Packard Hypersil ODS 5 μ column (100 mm×2.1 mm) using a gradient system with methanol (65%)/water(0.1M ammonium acetate) to 95% methanol at 0.3 $ml.min^{-1}$. The mass spectrometer was scanned from 50–1500 Daltons every 5 secs. with a 0.2 sec inter-scan delay. The electrospray cone voltage was set at 10V to minimize fragmentations.

Data analysis

The programs for this project were written in the development software MATLAB 4.2c.1 (The MathWorks, Inc., Cochituate Place, 24 Prime Park Way, Natich, Mass. 01760). The computer configuration is a PENTIUM, 90 MHZ, 24 MB's of RAM.

Results

In order to illustrate the method, the innerproducts discussed above are shown in Table 2 for the mass chromatograms in FIG. 4.

a) The innerproducts of the columns of $A(\lambda)^R$ and $A(w=5,\lambda)^R$, which results in high values for low noise (no spikes) signals (masses 72 and 186).

b) The innerproduct of the columns $A(\lambda)$ and $A(s)$, which results in high values for low background signals (masses 587 and 186).

c) The innerproduct of the columns of $A(\lambda)^R$ and $A(w=5,s)^R$ (the MCQ index) which results in high values when the signal is both of low noise and low background (mass 186).

In these notations the width of the smoothing window is shown to be 5.

The dashed profiles in FIG. 4 show the smoothed and standardized mass chromatograms (eq. 9). FIG. 4*a* shows a mass chromatogram for mass 587 that is mainly characterized by spikes and has a low background. As a consequence, the smoothed standardized mass chromatogram significantly alters the magnitude of the spikes, but no significant offset is present, as is confirmed by Table 2.

TABLE 2

The matrices from which the innerproducts are calculated to detect spikes, background and their combination (background and spike detection).

| Mass | 'Spike Detection' $A(\lambda)^R, A(w = 5,\lambda)^R$ | 'Background Detection' $A(\lambda), A(s)$ | MCQ Index $A(\lambda)^R, A(w = 5,s)^R$ |
|---|---|---|---|
| 587 | 0.55 | 0.98 | 0.51 |
| 72 | 0.99 | 0.40 | 0.39 |
| 393 | 0.78 | 0.85 | 0.58 |
| 186 | 0.99 | 0.98 | 0.97 |

Mass chromatograms such as that shown in FIG. 4*b* are the source for a high background signal. The noise-like pattern is generally several scans wide, which is the reason why the spike detection part of the algorithm is not greatly affected in Table 2. Because of the relative high overall intensity of this mass chromatogram, there is a significant difference between the length-scaled mass chromatogram and the standardized mass chromatogram. The difference is reflected in the standardized smoothed mass chromatogram in FIG. 4*b* and as a consequence in the MCQ index in Table 2.

The mass chromatogram in FIG. 4*c* shows a discernible peak, although there is a relatively high mount of noise. Both the spike detection and the background detection part of the algorithm show a less then perfect mass chromatogram, although the innerproducts are still relatively high. The combination of the spike and offset background detection clearly show that this is a problematic mass chromatogram, as seen in Table 2.

The mass chromatogram in FIG. 4*d* is of a high quality, which is expressed by a high value for the spike detection part (reflecting the absence of spikes) as well as the background detection part of the algorithm, and as a consequence, also in the MCQ index as defined by eq. 9 (Table 2).

CODA was developed to be fast. CODA is in MATLAB code, which is an interpreter. For the data set studied (345 scans, 1451 masses) the calculations of the MCQ index of all mass chromatograms takes 48 secs. A compiled C++ version of CODA, which is under development, should be at least 1 to 2 orders of magnitude faster. This compares favorably with Abbassi's method (B. E. Abbassi, H. Mestdagh, C. Rolando, *Int. J. Mass Spectrum. Ion Proc.,* 1995, 141, 171–186), which takes 6–10 minutes with a compiled Pascal code.

A variable in the calculations is the width of the smoothing window and the MCQ level. In order to obtain a measure of success of the algorithm, for different smoothing and MCQ levels, the data reduction is calculated as follows:

$$R = \frac{nvar(\text{selected})}{nvar(\text{total})} \quad \text{eq. 10}$$

where nvar(selected) is the number of variables selected by CODA and nvar(total) is the total number of variables in the data set.

Figure 6:
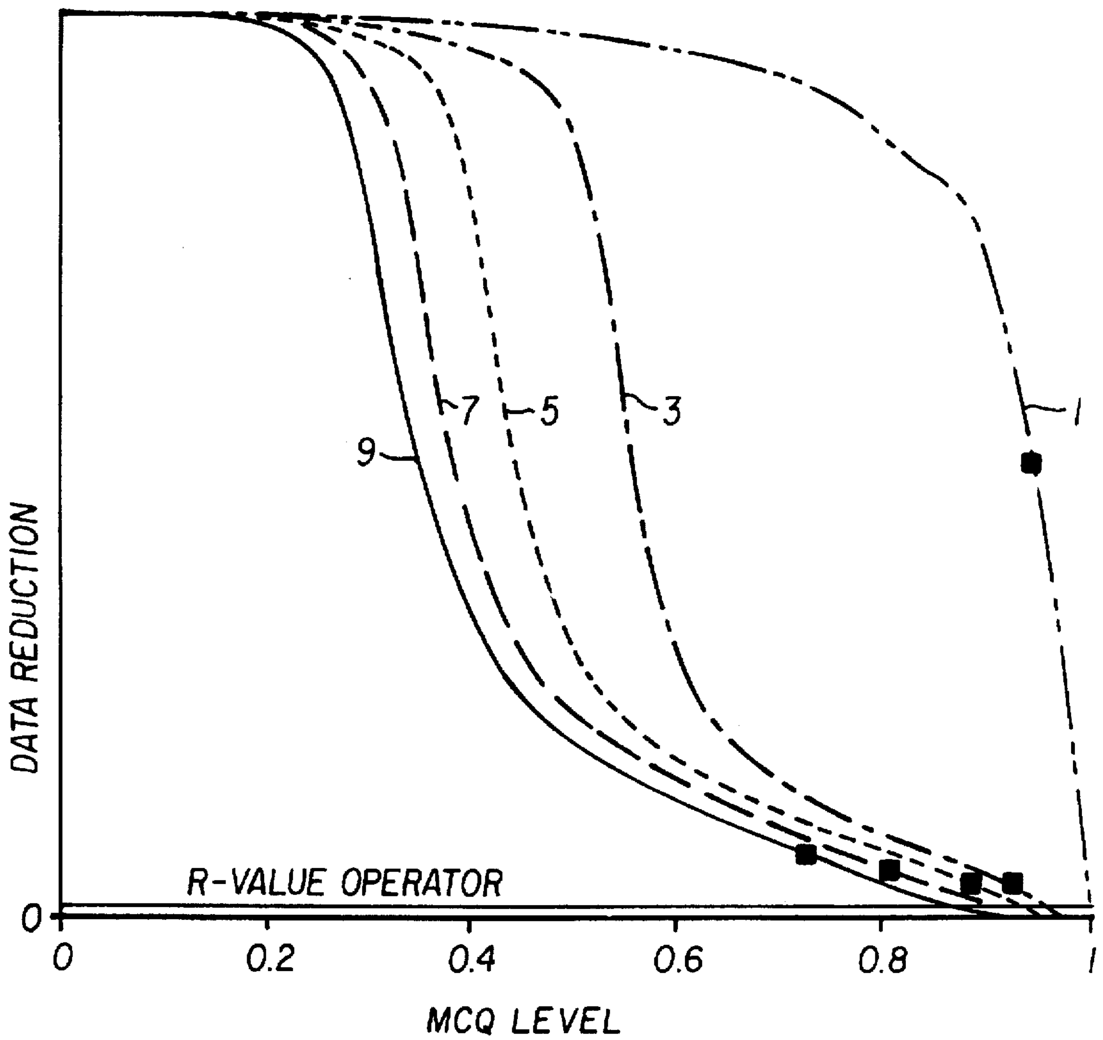
FIG. 6 is a plot that shows the data reduction as a function of the MCQ level and the width of the smoothing window.

In FIG. 6 the values of the data reduction R as a function of the MCQ level is shown for several different values of the width of the smoothing window. A minimum value for R is required where all the mass chromatograms detected by an experienced operator are included in the selected mass chromatograms. The operator selected 15 mass chromatograms, which results in a value for R of 0.0103, indicated as a horizontal line in FIG. 3. The lowest value for the data reduction index R where all the information as defined by the experienced operator is preserved is marked in the graphs. It can be seen that the best results (i.e. minimum value for R with preservation of all operator selected mass chromatograms) are obtained for the smoothing window widths 3 and 5. The R values obtained by CODA are always higher than the R value of the operator. This is due to the fact that a certain component may result in several highly correlated mass chromatograms, while the operator chooses only one mass chromatogram for each component.

Although the value for R is slightly lower for the smoothing window width of 3 than of the smoothing window of 5 (0.0351 versus 0.0358, corresponding to the selection of 51 versus 52 mass chromatograms), the results for the smoothing window of 5 were used in this study. The reason is that the results for a smoothing window 1 dramatically increases the R value, while a smoothing window of 7 results in a similar R value as for the smoothing window of 5. As a consequence, the choice of a smoothing window of 5 is a more robust choice.

Figure 3B:
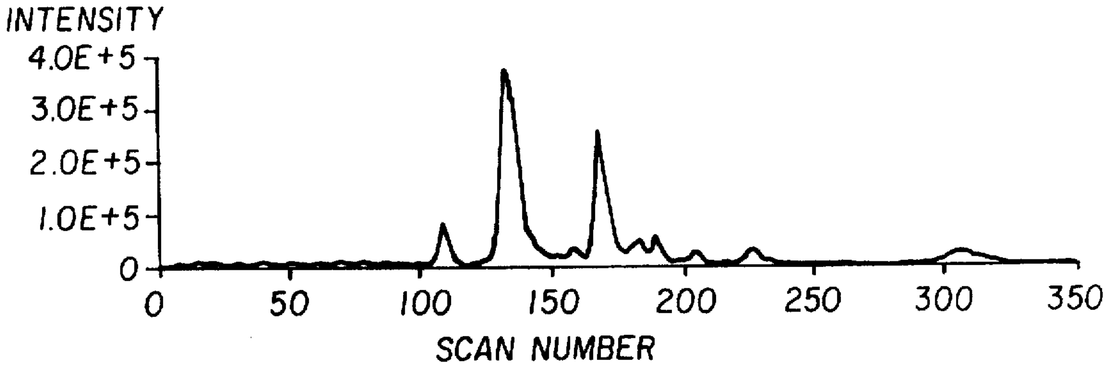
Figure 3C:
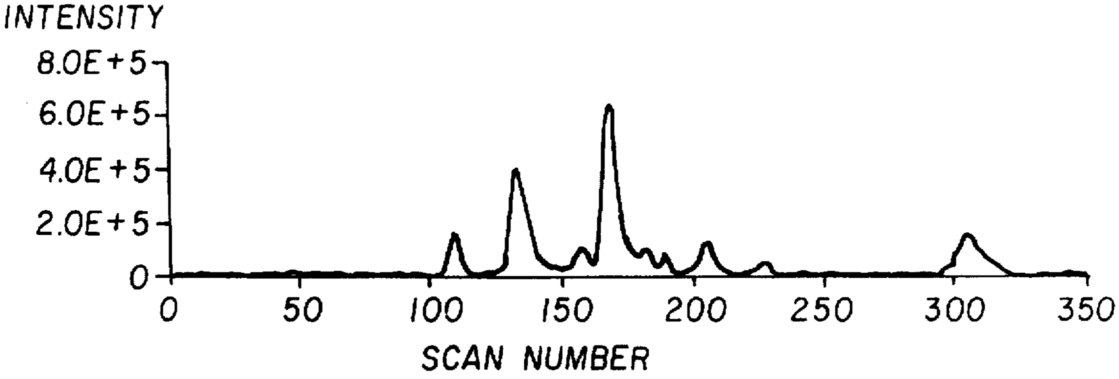
Figure 3D:
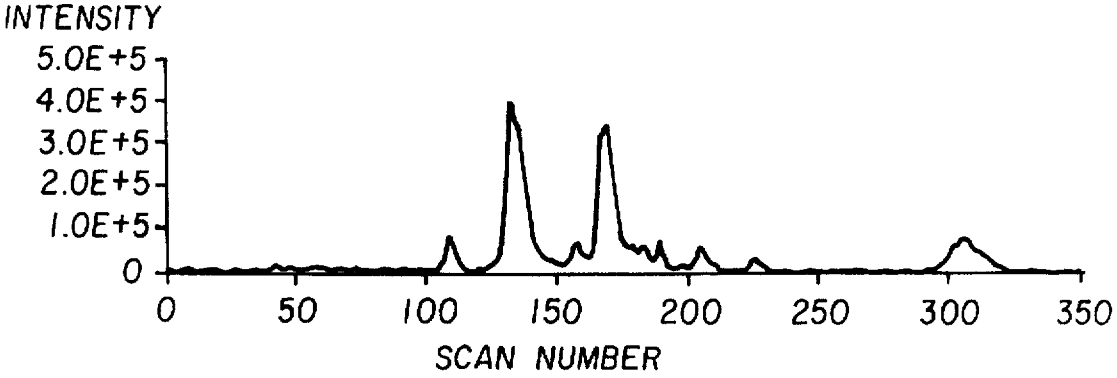

The TIC resulting from the mass chromatograms selected using a smoothing window of 5 and a correlation level of 0.89 (which results in the minimal value for R for this smoothing window, preserving all the mass chromatograms selected by an experienced operator) is given in FIG. 3*c*, together with the TIC based on the mass chromatograms selected by the operator in FIG. 3*b*. Clearly, these two curves are similar in shape although the relative intensities in 3*b* and 3*c* are different. This is due to the fact that the operator generally selects a single representative mass chromatogram for each component. As mentioned above, CODA will detect several correlated mass chromatograms for each component, depending on the amount of fragmentation, cluster peaks etc. As a final data reduction, it is possible to plot only the mass chromatogram with the highest maximum intensity at each scan position. This reduces the selection from 52 to 28 mass chromatograms. The reasons why the reduced selection contains more chromatograms than selected by the operator (28 versus 15 mass chromatograms) are the following:

a) The algorithm detected some minor components not observed by the operator (or possibly not regarded as significant).

b) Broad LC peaks may have individual mass chromatograms with maxima at slightly different scan positions, which are detected as separate peaks by CODA.

Figure 1B:
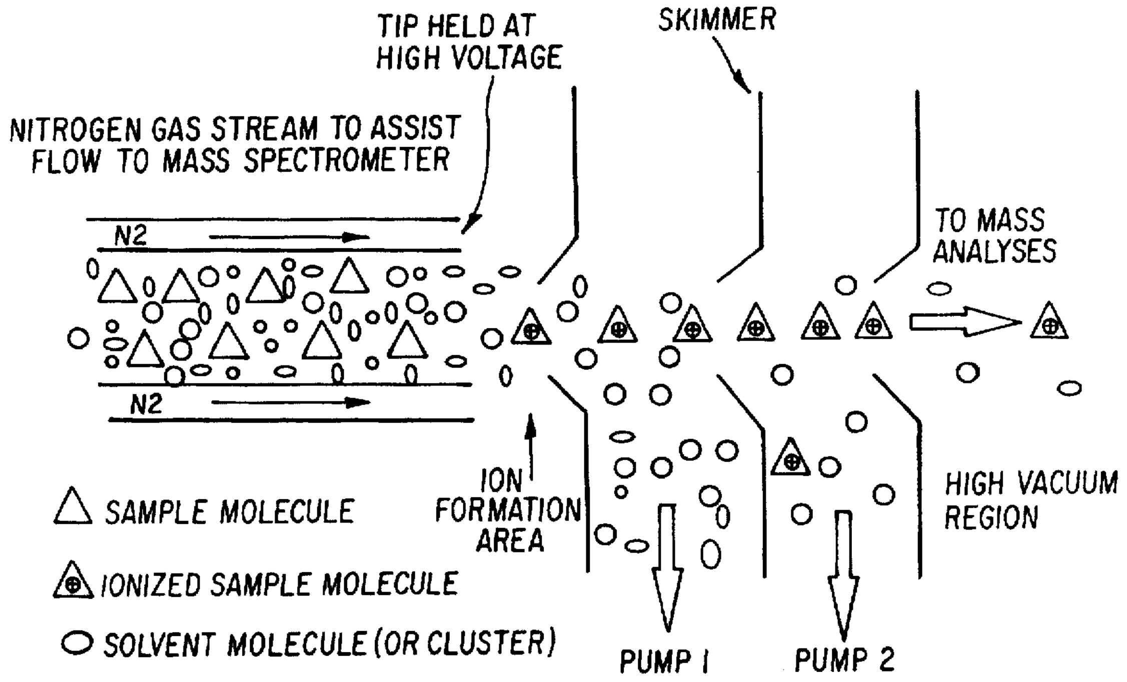
FIG. 1*b* is a schematic of an electrospray LC-MS Interface.
Figure 2:
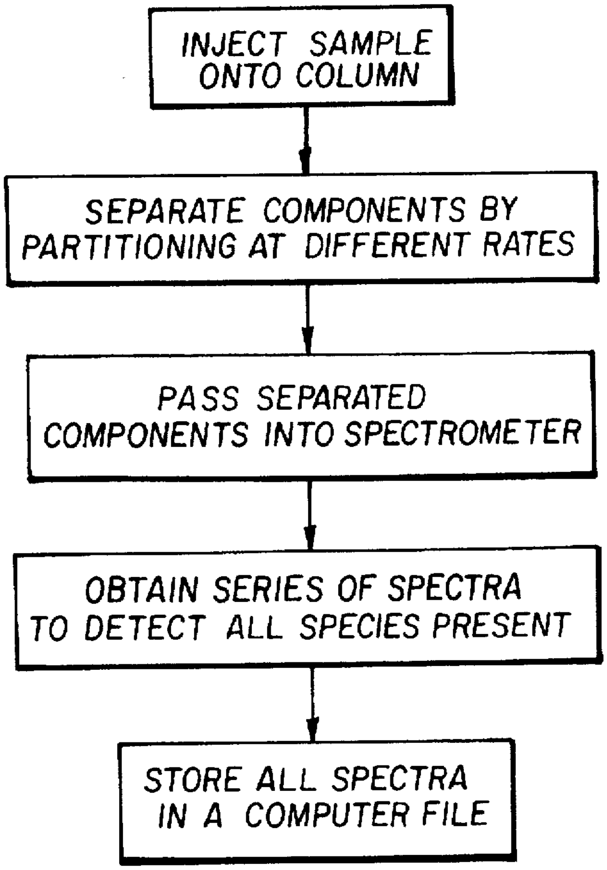
FIG. 2 is a flow diagram of chromatography with a spectrometric detector.

The TIC constructed using these mass chromatograms is given in FIG. 1*d*. As expected, there is a good match between the FIGS. 1*b* and 1*d*

It is also possible to plot and label all the selected mass chromatograms in CODA. This can be done for all the variables selected, or only for the reduced variable set. This has been seen to be a useful plot, especially for overlapping components, but without the use of color, it is not possible to give an appropriate figure, therefore, this plot is not shown.

Another way to look at the results obtained is based on the reduction of the number of variables. The original data set has 1451 mass values, the number of mass values selected by CODA was 52. The further reduced data set (described in flowdiagram 17–19 contains only 28 mass values.

Finally CODA was also tested for an LC-MS data set where isomers were present, resulting in mass chromatograms with two or more peaks. The approach worked equally well for this data set.

It is seen that a variable selection procedure was presented that significantly reduces the noise and the background in LC-MS data. The number of variables could be reduced from 1451 to 28, without losing significant information. This results in a significant improvement in the quality of the TIC traces for LC-MS data and a significant reduction in the time taken to analyze LC-MS data sets. It is noted that for the determination of a similarity index a variable and smoothed standardized variable can be used or a standardized variable and a smoothed variable can be used.

This is primarily a component detection device. For optimal usage, it is envisioned that the reduced TIC (FIG. 3*d*) would be available as a plot in a typical mass spectrometry vendor data system, so that the mass spectra corresponding to the detected LC peaks could be called up in the typical "point and click" mode of modern systems.

While the invention has been described with particular reference to a preferred embodiment, it will be understood by those skilled in the art the various changes can be made and equivalents may be substituted for elements of the preferred embodiment without departing from the scope of the invention. In addition, many modifications may be made to adapt a particular situation in material to a teaching of the invention without departing from the essential teachings of the present invention.

We claim:

1. A method of identifying and quantifying the chemical components of a mixture of organic materials comprising;

a first step of subjecting said organic material to chromatography to separate components of said mixture and a second step of subjecting the separated materials to spectrometry to detect and identify said components, wherein said chromatography and spectrometry is performed by a) injecting a sample into a column;

b) separating components by partitioning at different rates in the column;

c) passing separated components into a spectrometer;

d) obtaining a series of spectra to detect all species present; and e) storing the spectra in a computer file; the improvement comprising enhancing the spectral data by a variable selection using the following steps:

i) smooth the spectroscopic variables;

ii) obtain the mean value of the intensity of the spectroscopic variables;

iii) subtract the mean value obtained in step ii from the smoothed variables obtained in step i;

iv) normalize the output of step iii and the original spectroscopic variables;

v) compare the values of step iv to obtain a measure of similarity for each spectroscopic variable;

vi) determining a threshold value of similarity measurement so as to reject unwanted signals;

vii) select only those spectroscopic variables whose similarity measurement is over the threshold value; and viii) plot the sum of the selected variables versus time to obtain the enhanced chromatogram.

2. The method of claim 1 wherein step VI is determined by an interactive program which comprises setting a maximum smoothing window width and a tentative similarity threshold level and calculate as follows:

a) a mass chromatogram quality index is calculated for a plurality of degrees of smoothing and the mass chromatogram is scaled to equal length according to the equation, $$\lambda_j=\sqrt{\sum_{i=1}^{r} a_{ij}^2}$$

wherein $\lambda_j$ is the length of variable j, $a_{ij}$ is an element of the original data matrix A, where i represents the spectrum index and where j represents the variable index, b) the length scaled mixture is obtained by dividing all the variables by their length using the equation, $$\alpha(\lambda)_{ij}=\alpha_{ij}/\lambda_j$$

c) the data for step ii is smoothed for window sized w from 1 to WMAX using the equation, $$a(w)_{ij}^R=\frac{1}{w}\sum_{k=i}^{i+w-1} a_{kj}$$

wherein α(w)R/ij represents an element of the smoothed data matrix, the superscript R indicated that the matrix A(w) has a reduced size compared to the matrix A, The size of A is r*c, the size of A(w) is (r−w+1)*c, d) the standardization of the smoothed means chromatogram is calculated as:

$$a(w,s)_{ij}^R=\frac{a(w)_{ij}^R-\mu(w)_j^R}{\sigma(w)_j^R}$$

where α(w,s)R/ij stands for an element of the matrix A, which was first smoothed and then standardized; where the mean $\mu(w)_j$ is defined as $$\mu(w)_j^R=\sum_{i=1}^{r-w+1}\frac{a(w)_{ij}^R}{r-w+1}$$

and the standard deviation $\sigma(w)_j$ as $$\sigma(w)_j^R=\sqrt{\frac{1}{r-w+1}\sum_{i=1}^{r-w+1}(a(w)_{ij}^R-\mu(w)_j^R)^2}$$

e) the similarity index has between the length-scaled mass chromatogram and the smoothed and standardized mass chromatogram is determined by the equation, $$c_j=\frac{1}{\sqrt{r-w+1}}\sum_{i=1}^{r-w+1} a(\lambda)_{ij}^R a(w,s)_{ij}^R$$

f) the mass chromatograms above the predefined similarity level are selected.

3. The method of claim 1 wherein the chromatography is liquid chromatography.

4. The method of claim 1 wherein the spectrometry is mass spectrometry.

5. The method of claim 1 wherein the chromatography is gas chromatography and the spectrometry is mass spectrometry.

6. The method of claim 1 wherein the chromatography is liquid chromatography and the spectrometry is UV spectrometry.

7. The method of claim 1 wherein the chromatography is liquid chromatography and the spectrometry is NMR spectrometry.

* * * * *